Sept. 19, 1967   R. B. DOWNEY   3,342,600
PHOTOGRAPHIC FILM UNIT
Filed July 25, 1963   3 Sheets-Sheet 1

INVENTOR.
Rogers B. Downey
BY Brown and Mikulka
ATTORNEYS

Sept. 19, 1967      R. B. DOWNEY      3,342,600

PHOTOGRAPHIC FILM UNIT

Filed July 25, 1963      3 Sheets-Sheet 2

INVENTOR.
Rogers B. Downey
BY Brown and Mikulka
ATTORNEYS

Sept. 19, 1967  R. B. DOWNEY  3,342,600
PHOTOGRAPHIC FILM UNIT
Filed July 25, 1963  3 Sheets-Sheet 3

INVENTOR.
Rogers B. Downey
BY
Brown and Mikulka
ATTORNEYS

United States Patent Office 3,342,600
Patented Sept. 19, 1967

3,342,600
PHOTOGRAPHIC FILM UNIT
Rogers B. Downey, Lexington, Mass., assignor to Polaroid Corporation, Cambridge, Mass., a corporation of Delaware
Filed July 25, 1963, Ser. No. 298,001
14 Claims. (Cl. 96—76)

ABSTRACT OF THE DISCLOSURE

The present invention relates to composite photographic film units or assemblies of a type comprising a releasably-contained processing fluid. More particularly, the invention is concerned with a novel structure and method for obtaining a more perfect release and flow-control of a processing fluid and hence a more complete and even distribution of the fluid between given layers of the film unit during its progressive subjection to compressive means than has heretofore been possible. In so doing, the invention is primarily pointed toward the consistent obtainment of photographic prints of perfect quality, in both black-and-white and color, in a processing camera of a type embodying such compressive means between which the film unit is manually withdrawn. The film units, as described herein, are essentially those presently sold by Polaroid Corporation, Cambridge, Mass., U.S.A.

---

The present application is a continuation-in-part of copending U.S. application Ser. No. 215,817, filed Aug. 9, 1962, for "Photographic Film Unit," since abandoned.

There are a number of photographic processes which may be effected by distributing a processing fluid in a uniformly thin layer between a pair of superposed sheets. Generally, one of the superposed sheets comprises a photosensitive material; and the second may merely aid in distributing the processing fluid or may, if desired, possess any other characteristics. The processing fluid, in processes with which the present invention is typically concerned, is originally contained in a rupturable container carried on one of the superposed sheets.

In these processes, the photosensitive sheet is normally first exposed and then superposed on the second sheet. The two superposed sheets are then moved relative to and between a pair of juxtaposed members. These members may comprise a pair of substantially parallel rollers, a roller and a plate, or any other apparatus that will, as the sheets are moved through it, first collapse the fluid-carrying container, thereby forcing the fluid out of the container and between the superposed sheets as a mass extending transversely across the sheets, and, second, distribute the fluid from this mass so as to produce an approximately uniform fluid layer over the desired portion of the superposed sheets.

In order to insure that a fluid layer of the desired thickness covers the entire desired area, an amount of processing fluid in excess of that required merely to carry out the desired process is usually provided in the container. The amount of excess fluid that must be supplied depends, among other things, on the relative distribution of the fluid within the container, the distribution of the original fluid mass as it is forced out of the container, and the uniformity with which this mass is distributed between the superposed sheets. Two of the major factors affecting the initial distribution are the uniformity with which the container ruptures and the distribution of fluid within the container before rupturing. A nonuniform fluid layer may be caused by an uneven initial distribution and by the tendency of the juxtaposed members to bow at their centers due to hydraulic pressures generated in the processing fluid when the latter is more highly concentrated at the center. Since the excess fluid required to compensate for these nonuniformities should not be squeezed onto the juxtaposed members, it is preferable to provide some means for collecting all such excess fluid in a manner which insures that it will not escape. One previously known method of accomplishing this purpose is to provide an additional length to the superposed sheets for collecting therebetween the fluid in excess of that required for the processing function.

An object of the invention is to provide novel means for insuring that the processing fluid is uniformly distributed between the two sheets.

Another object is to provide means allowing a significant reduction in the amount of fluid required in the photographic process.

Still another object is to reduce the amount of sheet material that must be provided to collect and retain the excess fluid.

Other objects are: to provide means for reducing the bowing of the juxtaposed members; the elimination of strict manufacturing tolerances in the construction of the collapsible container; to provide, in a film unit including a rupturable container carrying a processing fluid, means for controlling the initial distribution and flow of said fluid upon rupture of the container by pressure-applying members; and to provide, in a film unit of the above-mentioned type, means for causing the fluid to be released from the container in a plurality of masses and to control the flow of said masses as the fluid is distributed between juxtaposed sheets.

Other objects of the invention will in part be obvious and will in part appear hereinafter.

The invention accordingly comprises the product possessing the features, properties and the relation of components which are exemplified in the following detailed disclosure, and the scope of the application of which will be indicated in the claims.

For a fuller understanding of the nature and objects of the invention, reference should be had to the following detailed description taken in connection with the accompanying drawings wherein.

Figure 2:
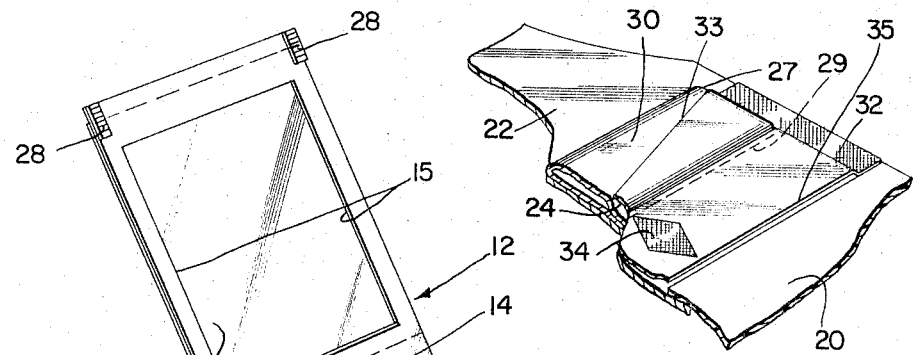
FIG. 2 is a perspective view, partially in section, of a portion of the unit of FIGURE 1.
Figure 1:
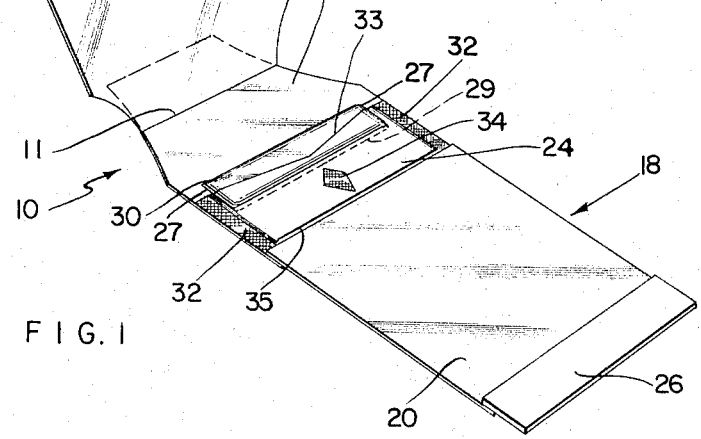
FIGURE 1 is a perspective view of a photographic film unit embodying one application of the present invention.
Figure 3:
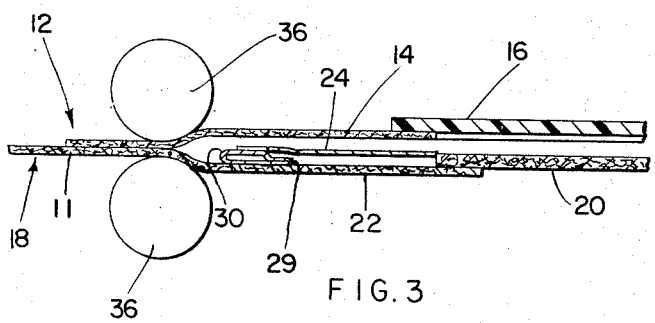
FIG. 3 is a sectional view of the unit of FIGURE 1, the section being taken parallel with the sides of the film unit.

Reference is now made to FIGS. 1 through 3 of the drawings wherein is illustrated a photographic film unit 10 embodying the invention, it being understood that the thickness of various components is exaggerated for the purpose of clarity of illustration. Film unit 10 comprises a photosensitive element 18 and a second or print-receiving element 12. The two elements are in the form of sheets, substantially coextensive in size and shape and adapted to being superposed one on the other.

Photosensitive element 18 comprises a photosensitive sheet 20 located intermediate the ends of a leading support sheet 22 and a trailing excess fluid collecting sheet 26, the terms "leading" and "trailing" indicating the sequential order of subjection to compressive means. The photosensitive sheet, generally rectangular in shape, comprises a layer of a photosensitive material, such as a silver halide emulsion, on a suitable support. This support may comprise any flexible sheet material, generally used for a film base, which is, or may be made, opaque to actinic light. The leading support sheet 22 and trailing sheet 26, which are connected to the ends of photosensitive sheet 20, may also comprise any flexible sheet material opaque to light actinic to the photosensitive sheet. Trailing sheet 26, generally rectangular in shape, has a width equal to the width of the photosensitive sheet and a length sufficient to collect and retain any excess fluid used in the photographic process. Leading support sheet 22 is also substantially rectangular and, except for the end most distant from photosensitive sheet 18 which may be narrowed to facilitate its insertion between the pressure-applying members, is equal in width to the photosensitive sheet. Sheet 22 is adapted to perform several functions including providing a leader for connecting the photosensitive and print-receiving elements, properly locating the elements relative to each other, mounting a container of fluid processing composition and cooperating in the spreading of the fluid in a layer or predetermined thickness between the photosensitive and print-receiving elements.

The second or print-receiving element 12 comprises a carrier sheet 14, similar in shape to and substantially coextensive with element 18, and a print-receiving sheet 16, mounted on the side of the carrier sheet adapted to be superposed with the photosensitive element and so positioned intermediate the ends of sheet 14 as to be in substantial registration with photosensitive sheet 20 when the photosensitive and print-receiving elements are superposed. Carrier sheet 14, comprising a relatively thin but strong flexible sheet material, is provided with a rectangular aperture 15 overlying print-receiving sheet 16 which defines the areas of sheets 16 and 20 which may come into contact when the element are superposed and thereby determines the area upon which the photographic print may be formed. Print-receiving sheet 16 typically comprises an image-receiving layer carried on a suitable support. This support, generally rectangular and substantially coextensive with photosensitive sheet 20, may comprise any flexible sheet material, useful as a base for photographic film, which may be made opaque to light actinic to the photosensitive sheet, depending upon the manner in which the film unit is to be processed.

The leading portions of carrier sheet 14 and support sheet 22 are adhered to one another and form a hinge 11. This hinge allows sheet elements 12 and 18, which are normally pivoted apart while the photosensitive sheet is being exposed to actinic light, to be properly located relative to one another in superposition during the subsequent developing process in which the processing fluid is spread between the two elements.

In the form of film unit illustrated, the processing fluid, typically comprising a silver halide developer, a silver halide solvent, an alkali and a thickening agent, is provided in a rupturable container 30 attached to support sheet 22 on the side thereof which is to face carrier sheet 14 (between the superposed elements). Container 30, in the present embodiment, comprises a rectangular blank of fluid- and air-impervious sheet material folded longitudinally upon itself with its edges sealed to form an elongated cavity in which a predetermined amount of processing fluid is contained. The longitudinal edge seal is substantially weaker than the end seals so that the application of compressive pressure to the container will cause rupture of the longitudinal seal and the unidirectional release of the processing fluid. Container 30 may be mounted, for example, on support sheet 22 with the longitudinal sealed portion, designated trailing edge 29, extending transversely of the support sheet. For best results, the fluid-filled cavity of the container should be substantially equal in length to the width of aperture 15. The processing fluid will then be discharged toward, and as an elongated mass extending transversely the entire width of, the area of elements 12 and 18 over which it is to be spread.

For a further description of certain embodiments of rupturable containers such as container 30 and of photographic processes in which transfer prints are produced directly from an exposed photosensitive material, see U.S. Patent No. 2,543,181, issued to Edwin H. Land on Feb. 27, 1951.

As previously noted, the photosensitive element is first exposed and is thereafter superposed with the print-receiving element. The superposed elements are then drawn, commencing with the end comprising hinge 11, between a pair of pressure-applying members. These members are shown in FIG. 3 as comprising a pair of axially parallel rollers 36. As the film unit 10 passes between the rollers, container 30 is progressively compressed, beginning at its leading edge, thereby generating a hydraulic pressure in the enclosed processing fluid. This pressure builds up until the force on the walls of the container is sufficient to rupture the longitudinal seal comprising the container's trailing edge 29.

For optimum distribution, it is desirable that the container rupture simultaneously along the entire trailing edge. The sealed ends 27 of the container, however, tend to retard the rupturing of the end portions of the longitudinal seal. Ends 27 also tend to constrict the end portions of the cavity within the container, the natural tendency therefore being for the greater portion of the processing fluid to collect in the central portion of the elongated cavity. Although extended periods of storage of the container in a vertically disposed position with respect to the longitudinal axis may cause migration of the fluid towards the lower end, the undesirable effect of having a nonuniform distribution of fluid within the container is still present. The tendency would then be for the container to rupture initially adjacent one end, with a larger concentration of the initial fluid mass at that end and, consequently, a nonuniform layer of fluid distributed between the sheets. For purposes of illustration, however, it will be assumed that the distribution of fluid within the container cavity has its largest concentration at or near the center. The pressure generated in the processing fluid, which is made quite viscous to insure rupture of the entire seal regardless of possible localized initial rupturing, is not uniform but varies from point to point and tends to be the greatest in the region of the greatest amount of fluid. This combination of both a relatively larger amount of fluid and a greater hydraulic force at the center portion of the container increases any tendency the longitudinal seal may have to rupture initially at the center of trailing edge 29, and may result in substantially more processing fluid being initially dispensed at the center of the superposed sheets than at their lateral edges.

Figure 4:
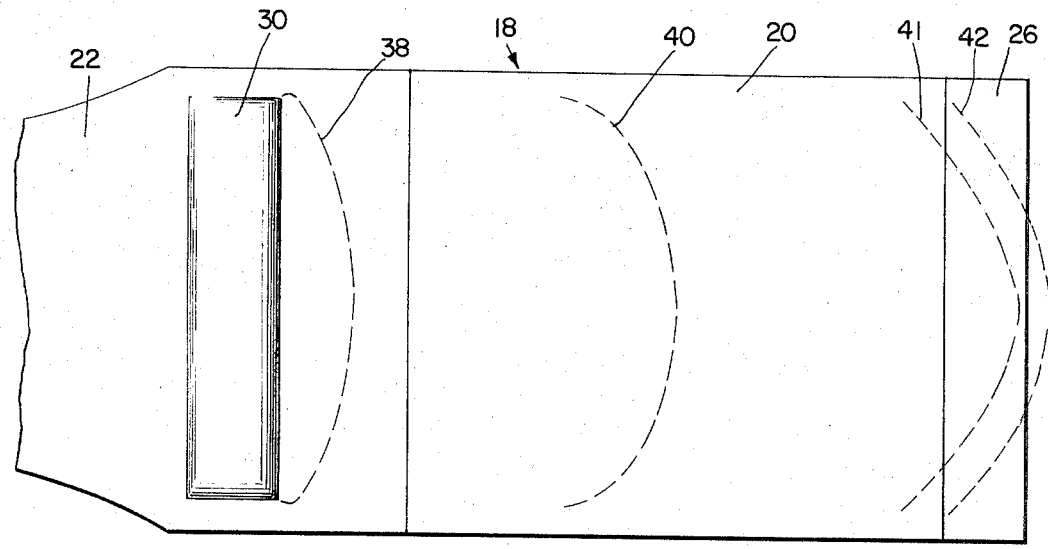
FIGS. 4 and 5 are diagrammatic plan views of the film units during processing.

Reference is now made to FIG. 4 showing the possible nonuniform initial discharge and subsequent distribution of the processing fluid on element 18 in a film unit which does not embody the present invention. Broken line 38 represents the distribution of the processing fluid immediately after being discharged from collapsible container 30. The apparent nonuniform distribution is accentuated by the fact that the fluid layer tends to be thicker at the center of element 18 than along the lateral edges. With this initial fluid distribution, as superposed elements 12 and 18 are drawn between rollers 36 (to the left viewing FIG. 3), the fluid is advanced relative to and between the sheets along the generally curved or tongue-shaped front represented by broken lines 40, 41 and 42.

In order to insure that the predetermined processing area, usually rectangular, will be completely covered by a fluid layer of the desired thickness, it is generally necessary to supply more than the minimum amount of fluid required to produce this desired layer. The tendency of the tongue-shaped distribution to provide too little fluid at the lateral edges of the sheets and to provide a heavy fluid concentration, resulting in a high hydraulic pressure and bowing of the rollers, at the center of the sheets, increases the amount of additional fluid required. The amount of excess fluid required could be substantially reduced if the fluid were more nearly uniform in concentration across the front at which it is released and were advanced along a front which was approximately straight, perpendicular to the direction of advancement, and equal in length to the width of the area over which spreading is supposed to occur. Such an even distribution would not only insure complete coverage, but also, by reducing the fluid concentration and hydraulic force at the center of the rollers, reduce the bowing of the rollers and produce a more uniform fluid layer.

In all cases, however, it would still be desirable to provide some excess fluid in order to allow for slight nonuniformities, thus insuring complete distribution. For this reason, some means must be provided to trap and retain the excess fluid to prevent it from being squeezed from between the superposed sheets and collecting on the pressure-applying rollers. One such means, shown in FIGURE 1, comprises the trailing portion of carrier sheet 14, fluid collecting sheet 26, and a pair of spacing elements 28, typically comprising paperboard, hard rubber or plastic blocks adhered to the lateral edges of sheet 14 and having a length approximately equal to that of fluid collecting sheet 26. As the spacing elements 28 are drawn between the rollers, the rollers 36 are separated by a greater amount than before. The excess processing fluid may now be spread in a thicker layer and is thus collected and retained in the space thus provided between sheet 26 and the portion of carrier sheet 14 opposite thereto. The fluid collecting sheet 26 and portion of carrier sheet 14 which comprise the collecting area must be of sufficient length to retain all excess fluid forced beyond the trailing end of photosensitive sheet 20. The length required is, of course, dependent on both the amount and the distribution of the excess fluid. Since the rollers should not be separated until all of the predetermined processing area of photosensitive sheet 20 has been covered by fluid, it is apparent from broken line 42 in FIG. 4 that the tongue-shaped distribution, which utilizes only the center portion of fluid collecting sheet 26, could cause the trapping means to fail to collect and retain all the excess fluid unless the collecting sheet were much greater in length. If, alternatively, the rollers were separated earlier, all fluid could be retained, but, as illustrated by broken line 41, a portion of sheet 20 would not be covered by any processing fluid.

Should the fluid, however, be distributed along a relatively straight front, substantially perpendicular to the direction of spreading and approximately equal in length to the width of the desired area, the entire width of the trapping means would be utilized thereby permitting, with an equal amount of excess fluid, that the trapping means and hence the entire film unit 10 be made shorter without sacrificing the required fluid coverage. This reduction in length would not only result in a reduction in the amount of material required to produce a film unit, but would also allow a reduction in the size of all future cameras, film packs or other apparatus in which similar film units may be used.

The present invention as illustrated in FIGS. 1 through 3 includes means for reducing the initial fluid concentration in the center of the superposed sheets, increasing the concentration at the lateral edges, and confining any fluid which as a result of uneven rupturing of the container 30 may be directionally released toward the lateral edges of the superposed sheets. The illustrated means comprises bib sheet 24, a substantially rectangular piece of flexible sheet material having a width approximately equal to the width of element 18. The leading edge 33 of the bib sheet, which extends partially over rupturable container 30, is cut in a shallow, wide-angled V-shape to prevent any portion of element 12 from catching on the sheet 24 as elements 12 and 18 are slidingly moved relative to one another into superposition; the trailing edge 35 is perpendicular to the lateral edges of element 18 and lies adjacent the junction of support sheet 22 and photosensitive sheet 20. Bib sheet 24 is adhered to sheet 22 along its lateral edges, areas 32 and in its center, sealed area 34, thereby forming, in conjunction with leading support sheet 22, a tunnel in which the trailing edge of rupturable container 30 is located.

Figure 5:
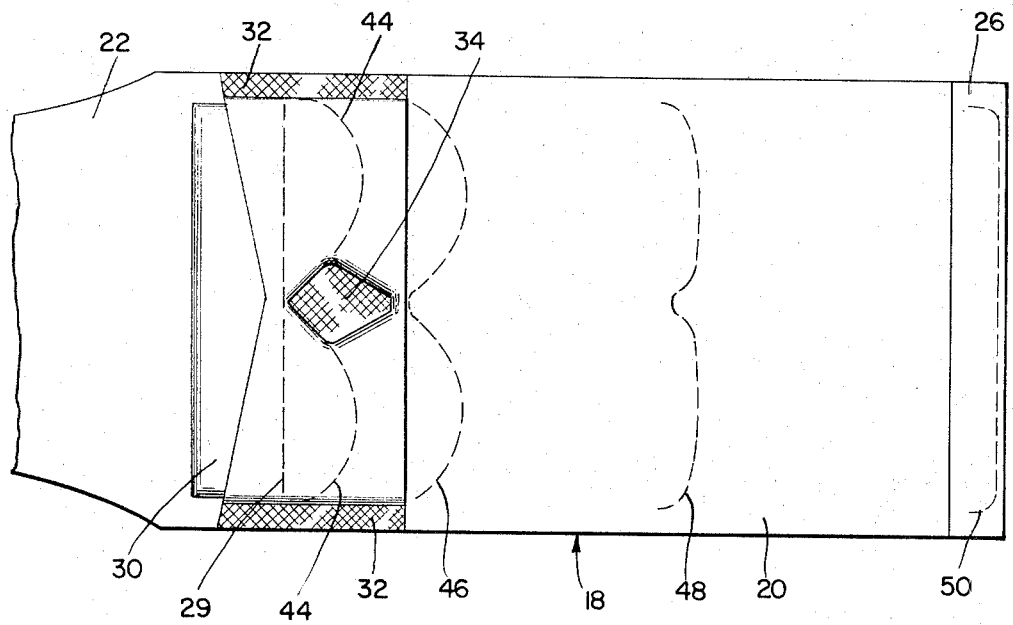

The distribution of the mass of processing fluid immediately after it is discharged from the rupturable container is determined by the relation of the bib sheet 24, leading support sheet 22, and the sealed areas 32 and 34. As the container 30 is compressed by rollers 36, the longitudinal seal comprising its trailing edge 29 is ruptured and the processing fluid unidirectionally released into the tunnel formed by sheets 22 and 24. If, for reasons previously discussed, a major portion of the processing fluid is released at the center of trailing edge 29, sealed area 34 prevents the fluid mass from remaining in the center of element 18 and forces the fluid to flow laterally toward the edges. Sealed areas 32, along the lateral edges of bib sheet 24, prevent any of the processing fluid from escaping from between the superposed elements. As will be understood, the narrow longitudinal portions of carrier sheet 14 at the sides of aperture 15, when compressed with superimposed longitudinal marginal portions of sheet 20 of like area, prevent escape of the fluid between these portions. The interaction of sealed areas 32 and 34 on the unidirectionally released processing fluid causes the initial distribution of the fluid mass to be the double-tongue represented by broken line 44 in FIG. 5. A distribution similar to that shown by broken line 44 will be obtained regardless of the point on trailing edge 29 that rupturing initially begins.

The two tongues of processing fluid will be physically separated until the fluid mass has passed beyond sealed area 34. Since all portions of photosensitive sheet 20 must be covered by the processing fluid, the two tongues of fluid should be joined before the leading edge of photosensitive sheet 20 passes between the rollers 36. The size and shape of the sealed area 34 required to insure this joinder is dependent on the amount and viscosity of the particular processing fluid used in the photographic process. A properly designed sealed area will first force the initial discharge of fluid toward the lateral edges of element 18 and will then allow sufficient fluid to flow laterally back toward the center of element 18 to insure that all portions of photosensitive sheet 20 are covered by the processing fluid. As illustrated, sealed area 34 is in the general shape of a diamond having one axis, about which it is symmetric, parallel to the free edges of sheet 20. The leading tapered section of area 34, namely the section having a vertex adjacent container 30, forces the processing fluid discharged at the center of the container to flow outwardly at an angle of approximately 45° to the direction of initial discharge; the shape of the trailing section, adjacent photosensitive sheet 20, is designed to control the subsequent inward fluid flow. The size and shape of both sections will vary according to the amount and type of fluid used in the film unit. In any film unit, however, a properly designed sealed area 34 will cause the fluid distribution, just before the leading edge of photosensitive sheet 20 passes between rollers 36, to be similar to that represented by broken line 46 in FIG. 5.

As superposed elements 12 and 18 continue between the rollers, the major portion of the processing fluid is advanced along element 18 in a direction generally parallel to the direction of sheet movement. The initial heavy lateral fluid concentration caused by the effect of sealed area 34 on the initial fluid flow, insures that areas adequately close to the longitudinal edges of photosensitive sheet 20 are covered with the requisite layer of processing fluid without requiring the addition of a large amount of excess fluid.

Some of the processing fluid, under the compressive force of rollers 36, has a pronounced tendency to decrease its internal stresses by flowing laterally to the direction of sheet movement, into the void originally caused by sealed area 34 between the two fluid tongues. This lateral flow insures that the central portions of photosensitive sheet 20 are covered with the requisite layer of processing fluid and also, as shown by broken line 48 in FIG. 5, causes the twin tongued distribution to become less pronounced as the fluid front advances along element 18. The final fluid distribution, after photosensitive sheet 20 has been compeltely covered and the rollers 36 are about to be separated by spacing elements 28, is as represented by broken line 50, an approximately straight line, perpendicular to the direction of sheet movement and extending across the desired width of the photosensitive element 18.

Since there is no heavy fluid concentration in the center portion of the superposed sheets, the pressure and force on the center of the rollers 36 is less than with a single-tongue distribution. The amount of roller bending is therefore decreased and a fluid layer of more nearly uniform cross-sectional area obtained.

Reference is again made to FIGS. 4 and 5 in which broken lines 42 and 50 represent, respectively, the final fluid distribution in similar film units which do not include and which do embody the present invention. As is evident from a comparison of the two figures, the distribution in FIG. 5 requires a shorter fluid trapping sheet 26 to retain a given amount of excess fluid than does the distribution shown in FIG. 4. Since the present invention also requires less excess fluid to insure complete coverage of the required area of sheet 20, the length of the fluid trapping means may be further reduced.

Bib sheet 24 further reduces the amount of processing fluid that must be supplied in each rupturable container by decreasing the proportion of the initial fluid discharge that, rather than being distributed over photosensitive sheet 20, is retained on support sheet 22. As may be observed by reference to FIG. 3, the portion of film unit 10 comprising, in section perpendicular to the plane of superposition of elements 12 and 18, print-receiving sheet 16, carrier sheet 14 and photosensitive sheet 20 is much thicker than the portion comprising only carrier sheet 14 and leading support sheet 22. Since rolls 36 are designed to produce a uniform fluid layer of predetermined thickness between sheets 16 and 20, and may have a fixed minimum gap between them that is greater than the combined thickness of sheets 14 and 22, a substantial amount of the processing fluid may be collected and retained in a layer on sheet 22 rather than being advanced to and distributed over photosensitive sheet 20. Bib sheet 24, by increasing the thickness of the superposed elements in the area between container 30 and photosensitive sheet 20, will decrease the thickness of the fluid layer formed in this region, and cause a larger portion of the fluid initially discharged from container 30 to be available to form the requisite fluid layer between the photosensitive and print-receiving sheets. If, as in the illustrated film unit, the central portion of "bib" sheet 24 is adhered to support sheet 22, the area between container 30 and photosensitive sheet 20 over which an unnecessary fluid layer may be formed will be reduced, and the proportion of discharged fluid distributed over the photosensitive sheet further increased.

Figure 6:
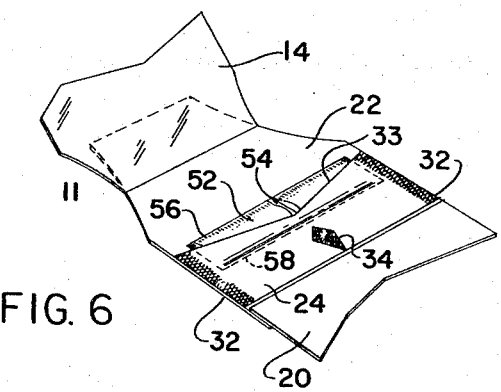
FIG. 6 is a fragmentary, perspective view of a film unit, as in FIGURE 1, showing an alternate structure for the rupturable container which carries the processing fluid.
Figure 7:
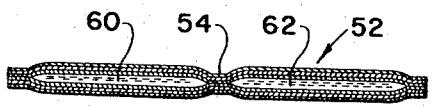
FIG. 7 is a longitudinal front section view of the container structure of FIG. 6.

Attention is now directed to FIGS. 6 and 7 wherein is illustrated an alternate embodiment of a rupturable container carrying the fluid processing agent. The reference numerals for the other elements of the film unit which are common to the first illustrated version of the invention are retained in FIG. 6. Container 52 and the fluid processing agent carried thereby may comprise the same materials as the container and agent discussed in connection with the FIGURE 1 embodiment. Container 52 is enclosed, as by sealing the opposing edges, at each end and at the longitudinal leading and trailing edges in substantially the same manner as container 30. Additionally, the opposing surfaces of intermediate transverse portion 54 are secured together in container 52. Transverse portion 54 is sealed from leading edge 56 to trailing edge 58, thus dividing container 52 into a plurality of fluid-carrying compartments 60 and 62, as best seen in FIG. 7. A more complete disclosure of containers of this type having a plurality of fluid-carrying compartments may be found in U.S. Patent No. 2,750,075, issued June 12, 1956, to Edwin H. Land et al.

It is obvious that the fluid carried by container 52 cannot be concentrated at the center of the container, as in the previous embodiment, since the center is sealed off. When the film unit including container 52 is advanced through pressure-applying members such as rollers 36, the hydraulic pressure causes the seal at trailing edge 58 to rupture, at least in the portions thereof contiguous to compartments 60 and 62. The fluid is thus released from container 52 in two separate masses which are advanced relative to the sheets as the latter continue to be drawn through the rollers. The manner of flow of the two fluid masses is controlled by bib sheet 24 and sealed areas 32 and 34 thereof. The advantages of reducing the amount of fluid required and the amount of sheet material required to collect the excess fluid which were achieved with the embodiment of FIGURE 1 are also present here. In addition, the initial discharge of the fluid from the container is more uniform and the fluid will not migrate towards one end if the container is stored in a vertical position, such as is the case with a single compartment container.

Figure 8:
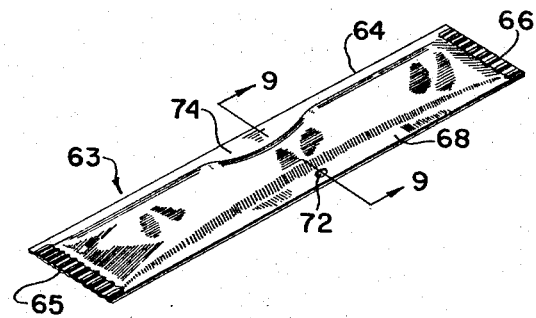
FIG. 8 is a perspective view of still another embodiment of rupturable container for use in conjunction with the present invention.
Figure 9:
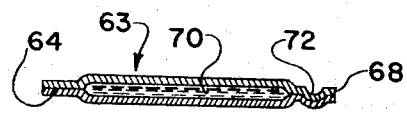
FIG. 9 is a side sectional view of the container of FIG. 8 taken on the line 9—9 thereof.

Turning now to FIGS. 8 and 9, there is illustrated yet another embodiment of the container for the fluid-processing agent, adapted to be employed in a film unit such as that of FIGURE 1. Container 63 may be formed of the same materials as containers 30 and 52. The opposing faces of container 63 are sealed along leading edge 64, ends 65 and 66, and trailing edge 68 to form liquid-carrying compartment 70. As in the previous embodiments, the seal at trailing edge 68 is somewhat weaker than the other seals so that the container will rupture along the trailing edge when a compressive force is applied.

An additional seal, in the area of trailing edge 68 denoted by the reference numeral 72, is effected by appropriate means such as the application of additional heat and pressure in this area. It will be noted in the illustrated embodiment that trailing edge 68 is indented or crimped in area 72. The seal at area 72 is strong enough so that, upon application of compressive force to container 63, the seal at trailing edge 68 does not rupture in area 72. Thus, the fluid is released from container 63 on each side of area 72. The initial discharge of fluid is therefore in the nature of two separate masses, similar to the double-compartmented container of FIGS. 6 and 7. U.S. application Ser. No. 297,565, now U.S. Patent 3,221,942 of Arthur Glass, filed of even date with the present continuation-in-part application, includes a further description of the structure and function of containers such as container 63.

In connection with the present invention, it is contemplated to employ container 63 in conjunction with the film unit in the same manner as containers 30 and 52. Area 72 is preferably centrally located with respect to trailing edge 68 and will therefore be positioned adjacent sealed area 34 of bib sheet 24. Upon release from container 63, the subsequent flow of the fluid will be governed by sealed areas 32 and 34 of sheet 24. If desired, the seal at leading edge 64 may be widened near the center, as indicated at 74. This has the effect of constricting the cross-sectional area of compartment 70 near the center, whereby the fluid is not so highly concentrated at this point. In general, container structures such as 52 and 63 are more desirable when the fluid processing agent is of relatively high viscosity, thus reducing somewhat the effect of sealed areas 32 and 34 of sheet 24.

It should be evident from the foregoing description that the superior fluid distribution and the savings in fluid and other materials that are effected by the use of the present invention will be obtained regardless of whether the rupturable container and bib sheet are adhered to the photosensitive element 18 as illustrated, or to the print-receiving element 12.

It should also be evident that although the present invention has been described by reference to a film unit of a type in which the photosensitive sheet is provided in the form known in the art as "sheet" film, the invention is equally applicable for use in film units in which "roll" film is employed.

Since certain changes may be made in the above product without departing from the scope of the invention herein involved, it is intended that all matter contained in the above description or shown in the accompanying drawings shall be interpreted as illustrative and not in a limiting sense.

What is claimed is:
1. A photographic film unit comprising:
 (a) a first element having a photosensitive portion adapted to be exposed and thereafter processed;
 (b) a second element having a portion adapted after exposure of said photosensitive portion to be superposed with at least said exposed photosensitive portion of said first element, whereby a processing fluid may be distributed between said elements;
 (c) an elongated flexible rupturable container releasably carrying said fluid and located between said element so as to extend transversely thereacross;
 (d) a frangibly-closed mouth extending substantially along the length of said container through which said fluid is discharged from said container in response to the progressive application of a compressive force to the walls thereof;
 (e) said container being mounted on one of said elements with said mouth facing said photosensitive portion of said first element; and
 (f) means for controlling the distribution of said fluid between said elements, said means including a sheet-like member extending transversely substantially across the width of said film unit and overlying at least the mouth of said container and a portion of said one element upon which said container is mounted, said member being secured to said one element at a central area of given configuration and at its extreme transverse marginal areas whereby, during said progressive application of a compressive force, said fluid, upon release from said container, is obstructed against passage at said secured areas, is first tunneled by said overlying sheet-like member and said one element to which it is secured along two paths, one at each side of said secured central area, and is merged into a continuous mass immediately beyond said secured central area prior to introduction thereof to said photosensitive portion of said first element, whereby said fluid is predominantly advanced in a direction generally parallel to the direction of progressive compression with a fluid front substantially normal to said direction and is distributed between and completely throughout the superposed facing unsecured portions of said elements.

2. The photographic film unit of claim 1 wherein said overlying member comprises a flexible sheet.

3. The photographic film unit of claim 2, wherein said secured central area is of a tapered configuration having a vertex adjacent to said mouth of said container.

4. The photographic film unit of claim 2 wherein said overlying flexible sheet terminates longitudinally of said film unit substantially contiguous with the leading edge of said photosensitive portion.

5. The photographic film unit of claim 2 wherein the opposing surfaces of said fluid container are at least partially fastened together substantially at a relatively-small area centrally of its longitudinal dimension whereby, upon the application of said compressive force, said processing fluid is discharged from said mouth in two fluid masses, one at each side of said relatively-small central area and are continued as two fluid masses by said secured central area of said overlying member and said one element.

6. The photographic film unit of claim 2, wherein said overlying sheet-like member is bonded to said one element to provide said secured areas.

7. The photographic film unit of claim 2 wherein said secured central area is of a generally diamond-like configuration and tapers both toward said container mouth and toward said photosensitive portion.

8. The photographic film unit of claim 5 wherein said opposing surfaces of said fluid container are bonded together completely across said area centrally of its longitudinal dimension to provide two fluid-carrying compartments, namely, one at each side of said bonded-together central area.

9. The photographic film unit of claim 5 wherein said opposing surfaces of said fluid container are fastened together at a central area adjacent to said container mouth.

10. The photographic film unit of claim 1 wherein is included at trailing portions of said unit, in terms of progressive compression thereof, means for trapping any excess of said processing fluid not retained between said superposed photosensitive portion and said portion of said second element.

11. The photographic film unit of claim 9 wherein said opposing surfaces of said fluid container are additionally sealed together adjacent to a central portion thereof to partially restrict the fluid-carrying capacity of said container adjacent to said central portion.

12. A photographic film unit comprising:
 (a) a first sheet-like element including a photosensitive silver-halide emulsion adapted to be exposed and thereafter processed;
 (b) a second sheet-like element including a portion adapted after exposure of said emulsion to be superposed with the latter whereby a processing fluid may be distributed between said first and second elements and a photographic print formed by a diffusion transfer process on said portion of said second element;
 (c) an elongated flexible container releasably-carrying said processing fluid and located between said first and second elements so as to extend transversely across said elements, the opposing surfaces of said container being at least partially fastened together at a relatively-small area centrally of its longitudinal dimension;
 (d) means providing a frangible mouth of said fluid container through which said processing fluid is dischargeable in response to the progressive application of a compressive force to the walls of said container;
 (e) said container being mounted on one of said elements with said mouth thereof directed toward said superposed photosensitive emulsion and portion for carrying said photographic print; and
 (f) means cooperating with said fluid container for controlling the distribution of said processing fluid between said first and second elements, said means comprising a flexible sheet-like member extending transversely across the width of said film unit and at least partially overlying said fluid container and said element upon which it is mounted including the frangible mouth of said container, said sheet-like member being secured to said last-named element both at a relatively-small central area of given configuration and at its transverse marginal areas, whereby during said progressive application of a compressive force to said fluid container and release of said fluid in the form of two streams, one at each side of said fastened-together area thereof, said fluid is tunneled further by said overlying sheet-like member and said element to which it is secured at said central area in a continuation of said two streams and is then merged into one continuous stream immediately beyond said secured central area prior to its introduction to said emulsion and superimposed portion of said second sheet-like element, said processing fluid being predominantly advanced in a direction generally parallel to the direction of progressive compression and having a fluid front substantially normal to said direction, whereby said fluid is distributed between and completely throughout said superimposed emulsion and portion.

13. A method of producing in a composite photographic film unit which includes a photosensitive emulsion, a sheet superimposed with said emulsion, and a frangible liquid container releasably-carrying a processing liquid positioned therebetween, a complete coverage by said processing liquid upon its release from said container throughout said photosensitive emulsion and said superimposed sheet during a progressive compression of said film unit, said method comprising the steps of releasing said processing liquid from said container in a direction toward said emulsion and superimposed sheet, dividing said processing liquid at a location adjacent to said container and transversely centrally of said film unit into two liquid streams immediately following its release from said container, tunneling said liquid in the form of said two streams for a predetermined distance, merging said two streams into a single stream immediately prior to its contact with said superimposed emulsion and sheet, and propagating an essentially longitudinal direction of flow of said liquid in the form of said single stream having a width and length adapted to completely cover the facing surfaces of said superimposed emulsion and sheet, with the flow-front of said liquid assuming a generally linear form which is normal to said longitudinal direction of flow.

14. The method of claim 13, wherein said processing liquid is released from said container in the form of two substantially-equal masses.

References Cited

UNITED STATES PATENTS

| | | | |
|---|---|---|---|
| 2,103,389 | 12/1937 | Salfisberg | 96—76 X |
| 2,686,716 | 8/1954 | Land | 96—29 |
| 2,698,243 | 12/1954 | Batchelder | 96—76 X |
| 2,750,075 | 6/1956 | Land | 96—79 X |

NORMAN G. TORCHIN, *Primary Examiner.*

R. MARTIN, *Assistant Examiner.*